United States Patent
Zhao et al.

(10) Patent No.: US 10,783,044 B2
(45) Date of Patent: Sep. 22, 2020

(54) METHOD AND APPARATUS FOR A MECHANISM OF DISASTER RECOVERY AND INSTANCE REFRESH IN AN EVENT RECORDATION SYSTEM

(71) Applicant: salesforce.com, inc., San Francisco, CA (US)

(72) Inventors: Yingwu Zhao, Lafayette, CA (US); Samarpan Jain, Fremont, CA (US); Hal Scott Hildebrand, Moss Beach, CA (US); Alexey Syomichev, Westport, CT (US); Emin Eliot Gerba, Plano, TX (US); Igor Pesenson, Berkeley, CA (US); David William Spragg, Oakland, CA (US); Jay Hurst, San Francisco, CA (US); Soumen Bandyopadhyay, Castro Valley, CA (US)

(73) Assignee: salesforce, inc., San Francisco, CA (US)

(*) Notice: Subject to any disclaimer, the term of this patent is extended or adjusted under 35 U.S.C. 154(b) by 101 days.

(21) Appl. No.: 16/222,925

(22) Filed: Dec. 17, 2018

(65) Prior Publication Data
US 2020/0097373 A1   Mar. 26, 2020

Related U.S. Application Data

(60) Provisional application No. 62/735,785, filed on Sep. 24, 2018.

(51) Int. Cl.
*G06F 11/14*   (2006.01)

(52) U.S. Cl.
CPC .... *G06F 11/1471* (2013.01); *G06F 2201/805* (2013.01); *G06F 2201/82* (2013.01)

(58) Field of Classification Search
CPC ............. G06F 11/1471; G06F 11/0766; G06F 11/079; G06F 11/3055; G06F 11/3062; G06F 2201/805; G06F 2201/82
See application file for complete search history.

(56) References Cited

U.S. PATENT DOCUMENTS 7,730,478 B2   6/2010   Weissman et al.
9,195,854 B2   11/2015  Jain et al.
(Continued)

FOREIGN PATENT DOCUMENTS

EP   3229151 A1   10/2017
WO  2018064375 A1   4/2018

OTHER PUBLICATIONS

Sookocheff K., "Kafka in a Nutshell," Sep. 25, 2015, downloaded from the internet https://sookocheff.com/post/kafka/kafka-in-a-nutshell/ on Sep. 17, 2018, 22 pages.

*Primary Examiner* — Nadeem Iqbal
(74) *Attorney, Agent, or Firm* — Nicholson De Vos Webster & Elliott LLP (57) ABSTRACT

A method and apparatus for a mechanism of disaster recovery and instance refresh in an event recordation system are described. A first request for events associated with a first topic is received. A first set of events associated with the first topic are retrieved from a primary event recordation system. Each event from the first set of events includes a first commit identifier indicating the order with which each event is stored in the primary event recordation system. For each event from the first set of events a first replay identifier is determined based on the first commit identifier and a first value of a low commit identifier. The first replay identifier is exposed to event consumers for identifying the event. In response to the first request each event from the first set of events is transmitted with the replay identifier.

20 Claims, 6 Drawing Sheets

(56) References Cited

U.S. PATENT DOCUMENTS

| | | | |
|---|---|---|---|
| 9,417,840 B2 | 8/2016 | Pradeep et al. | |
| 9,503,501 B2 | 11/2016 | Toussaint et al. | |
| 9,628,493 B2 | 4/2017 | Warshavsky et al. | |
| 9,767,022 B2 | 9/2017 | Pradeep et al. | |
| 9,767,040 B2 | 9/2017 | Pradeep et al. | |
| 10,178,156 B2 | 1/2019 | Pradeep et al. | |
| 10,185,603 B2 | 1/2019 | Pradeep et al. | |
| 10,262,032 B2 | 4/2019 | Zhao | |
| 10,275,281 B2 | 4/2019 | Pradeep et al. | |
| 10,298,582 B2 | 5/2019 | Syomichev et al. | |
| 10,332,129 B2 | 6/2019 | Torman et al. | |
| 10,339,126 B2 | 7/2019 | Pradeep et al. | |
| 10,380,094 B2 | 8/2019 | Warshavsky et al. | |
| 10,409,650 B2 | 9/2019 | Zhao et al. | |
| 10,452,462 B2 | 10/2019 | Oravivattanakul et al. | |
| 10,460,270 B2 | 10/2019 | Jain et al. | |
| 10,536,463 B2 | 1/2020 | Syomichev et al. | |
| 10,606,711 B2* | 3/2020 | Bishop | G06F 11/1471 |
| 2006/0085690 A1* | 4/2006 | Bolen | G06F 11/3476 714/39 |
| 2015/0127670 A1 | 5/2015 | Torman et al. | |
| 2016/0077798 A1 | 3/2016 | Pradeep et al. | |
| 2017/0075922 A1 | 3/2017 | Torman et al. | |
| 2017/0169195 A1 | 6/2017 | Lisanti et al. | |
| 2017/0293632 A1* | 10/2017 | Pradeep | G06F 16/13 |
| 2017/0351683 A1 | 12/2017 | Hurst et al. | |
| 2018/0025113 A1 | 1/2018 | Torman et al. | |
| 2018/0039513 A1 | 2/2018 | Zhao | |
| 2018/0096012 A1 | 4/2018 | Warshavsky et al. | |
| 2018/0096165 A1 | 4/2018 | Warshavsky et al. | |
| 2018/0107530 A1* | 4/2018 | Gupta | G06F 16/245 |
| 2018/0165309 A1 | 6/2018 | Tajuddin et al. | |
| 2018/0293258 A1 | 10/2018 | Oravivattanakul et al. | |
| 2018/0322168 A1 | 11/2018 | Levine et al. | |
| 2019/0013933 A1* | 1/2019 | Mercuri | G06F 16/27 |
| 2019/0042573 A1 | 2/2019 | Marcel et al. | |
| 2019/0057101 A1 | 2/2019 | Esserlieu et al. | |
| 2019/0095510 A1* | 3/2019 | Cruise | G06Q 10/10 |
| 2019/0095532 A1 | 3/2019 | Levine et al. | |
| 2019/0095533 A1 | 3/2019 | Levine et al. | |
| 2019/0095534 A1 | 3/2019 | Levine et al. | |
| 2019/0166177 A1 | 5/2019 | Zhao | |
| 2019/0236198 A1 | 8/2019 | Fernando et al. | |
| 2019/0238653 A1 | 8/2019 | Syomichev et al. | |
| 2019/0310899 A1 | 10/2019 | Oravivattanakul et al. | |
| 2019/0325039 A1 | 10/2019 | Fernando et al. | |
| 2019/0332315 A1 | 10/2019 | Oravivattanakul et al. | |
| 2020/0097503 A1* | 3/2020 | Zhao | G06F 16/907 |
| 2020/0174854 A1* | 6/2020 | Warshavsky | G06F 9/542 |

* cited by examiner

METHOD AND APPARATUS FOR A MECHANISM OF DISASTER RECOVERY AND INSTANCE REFRESH IN AN EVENT RECORDATION SYSTEM

CROSS-REFERENCE TO RELATED APPLICATIONS

This application claims the benefit of U.S. Provisional Application No. 62/735,785, filed Sep. 24, 2018, which is hereby incorporated by reference.

TECHNICAL FIELD

One or more implementations relate to the field of event recordation systems; and more specifically, to a mechanism of disaster recovery and/or instance refresh in an event recordation system of a multi-tenant environment.

BACKGROUND ART

An event recordation event recordation system stores events receives from event producers and distributes the events to one or more consumers. An exemplary event recordation system can be Apache Kafka®. The events are stored for a given topic and partition. The operation of storing the event can be referred to as committing the event in the event recordation system. Each event committed under a given partition is assigned an identifier (commit_ID) for that partition and topic. The commit_ID represents the order with which the event was committed in the event recordation system with respect to other events committed in the event recordation system.

A consumer, which may be referred to as a client of the event recordation system, can request events from the event recordation system by providing a given (topic, partition, commit_ID) triplet. The event recordation system delivers one or more events to the consumer that are committed to the event recordation system for the (topic, partition) pair and with commit_IDs greater than the given commit_ID provided by the consumer. The events may be delivered to the consumer on demand (e.g., by a request from the consumer through a Rest API) or alternatively as streaming mechanism. Clients generally consume events continuously and may replay (e.g., request to access/obtain) older events at any given time by providing an older commit_ID in their requests.

In typical event recordation systems, disaster recovery (DR) is enabled by constantly replicating data from a primary event recordation system to a target event recordation system. When a disaster occurs causing the data stored on the primary event recordation system, events need to be rerouted over to the target event recordation system seamlessly. However, in typical event recordation systems, the replication of the data does not preserve commit_IDs of events from one event recordation system to another event recordation system. For example, a stream of events committed in a primary event recordation system with commit_IDs={1000, 1001, 1002, . . . 2000} could be committed to a target event recordation system with commit_IDs={0, 1, 2, . . . , 1000} after the replication mechanism is performed. In one example, if DR occurs when a consumer consumed an event with commit_ID 1500 from the primary event recordation system, and this consumer needs to receive the following events from the target event recordation system that corresponds to commit ID 500, there needs to be a determination of which commit_ID the consumer needs to read the events in the target event recordation system. To determine the corresponding commit_ID, a translation from the commit_IDs in the primary event recordation system to the commit_ID in the target event recordation system needs to be performed.

For this translation to work, one will theoretically need to maintain a map between these two streams of commit_IDs in the primary event recordation system and the target event recordation system, which is prohibitively expensive hence generally beyond being practical.

Several mechanisms attempt to provide a solution to this problem. In one existing mechanism, after events are transmitted from the target event recordation systems, consumers start consuming all events committed to the target event recordation system from the beginning to ensure that they received all committed events. However, this is not a practical solution and very expensive solution as the consumer will need to go through large or very large amount of data prior to being able to catch up with the current events that effectively need to be received. The consumer may receive duplicate of old events previously received from the primary data center.

In another mechanism, after events are transmitted from the target event recordation systems, consumers, consumers start consuming all events committed to the target data center from the tip (the end of the committed events in the target event recordation system). In other words, the consumer consumes only new events committed to the target event recordation system. This solution has the advantage that it causes event loss and the consumer may not receive all events that were meant for the consumer after it starts consuming from the target event recordation system, even if those events were in fact committed in the target event recordation system.

In another mechanism, other attributes present in the event's payload can be used to search and determine the translation of commit_IDs between the primary event recordation system and the target event recordation system. This solution is also quite expensive and does not scale well.

In another mechanism, time stamps may be used as periodic check points to determine the translation between commit_ID in the primary event recordation system and commit_ID in the target event recordation system. After DR, consumers fail over to their latest checkpoints. For example, a consumer could have the last check point recorded at a first time and after DR, it would fail over to that first time on the target event recordation system. Returning to the initial example, this time can correspond to a commit_ID of 400. In this example, the consumer does not have an accurate recovery and in order to catch up to its current consumption state, it re-consumes events {400, . . . , 500} from target event recordation system which correspond to events with commit IDs {1400, . . . , 1500} in primary event recordation system that it had previously consumed.

The four mechanisms presented above have several advantages, requiring the consumer to consume events, lose events, or perform some extensive processing. These solutions are either inaccurate, time consuming, and/or inefficient creating a processing burden on the consumer for the determination of its current state of event consumption. Further, all the existing solutions described above require the consumers to implement special logics to deal with failover, which is a huge inconvenience.

Further, DR does not only happen during real disaster scenarios, where a primary event recordation system fails and a recovery from another event recordation system is needed, DR mechanisms are also needed when a site switch exercise is performed to simulate DR scenarios. These site switch exercises can be performed on regular basis for testing purposes to ensure all the DR mechanism works flawlessly when real disasters occur. These routine exercises could occur more often, e.g. monthly or even weekly. Repeating any of the solutions presented above multiple time in a given time period causes a pretty unpleasant experience for the consumers. The consumers may need to deal with redundant delivery and de-duplicate them and/or with loss of data.

Further, the solutions presented above do not apply to event recordation systems operating in multi-tenant systems where the events committed to a particular event recordation system of the event recordation system may belong to multiple tenants. For example, when high nontrivial multiplexing layer are built on top of the event recordation system, where multiple tenants share the same topic partition in the event recordation system, none of the approaches above would work at all.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The methods and system describe a mechanism of disaster recovery (DR) and instance refresh in an event recordation system of a multi-tenant environment. The solution ensures accurate and seamless fail-over, with a continuous stream of events received by consumers when the disaster recovery occurs.

An event is an identifiable unit of data that conveys information about operations that occur in a system (e.g., measurements recorded in an IoT device, actions performed by a user of a social networking system, failures of an operation or a system, etc.). Events can be user-generated or system-generated. In some implementations, an event is associated with an initial partition and an initial topic. A topic can be information or details on the event that can be used to group one or more events. In a similar manner, the partition can be information on the event, which can be used to group multiple events. The partition and topic can be used to aggregate stream of events with the same topic and partition and can be used to transmit these events to one or more consumers that requests them based on the partition and topic they are associated with. In a non-limiting example, of a multi-tenant platform, the initial partition can be an organization identifier (org_ID) where each one of the org_IDs uniquely identifies a tenant within the system, and the initial topic can be a word or alphanumerical value added to a record generated in the system. Other examples of topics or partitions can be contemplated without departing from the scope of the present implementations.

A huge challenge for platforms using event recordation systems (e.g., enterprise platforms) is to be able to replay specific events from the massive quantity of events that are stored/persisted from millions of IoT devices and/or applications.

When event consumers request events from an event recordation system, having the ability to replay is a key feature for allowing the consumer to have a durable data stream and avoid data loss. A replay request is a request for event that the consumer would like to access which were stored in an event recordation system in the past. When the system supports the replay feature, in the case of disconnect, the client can request to obtain events that were received prior to or during the disconnect and is able to obtain the data without gaps or loss.

Figure 1A:
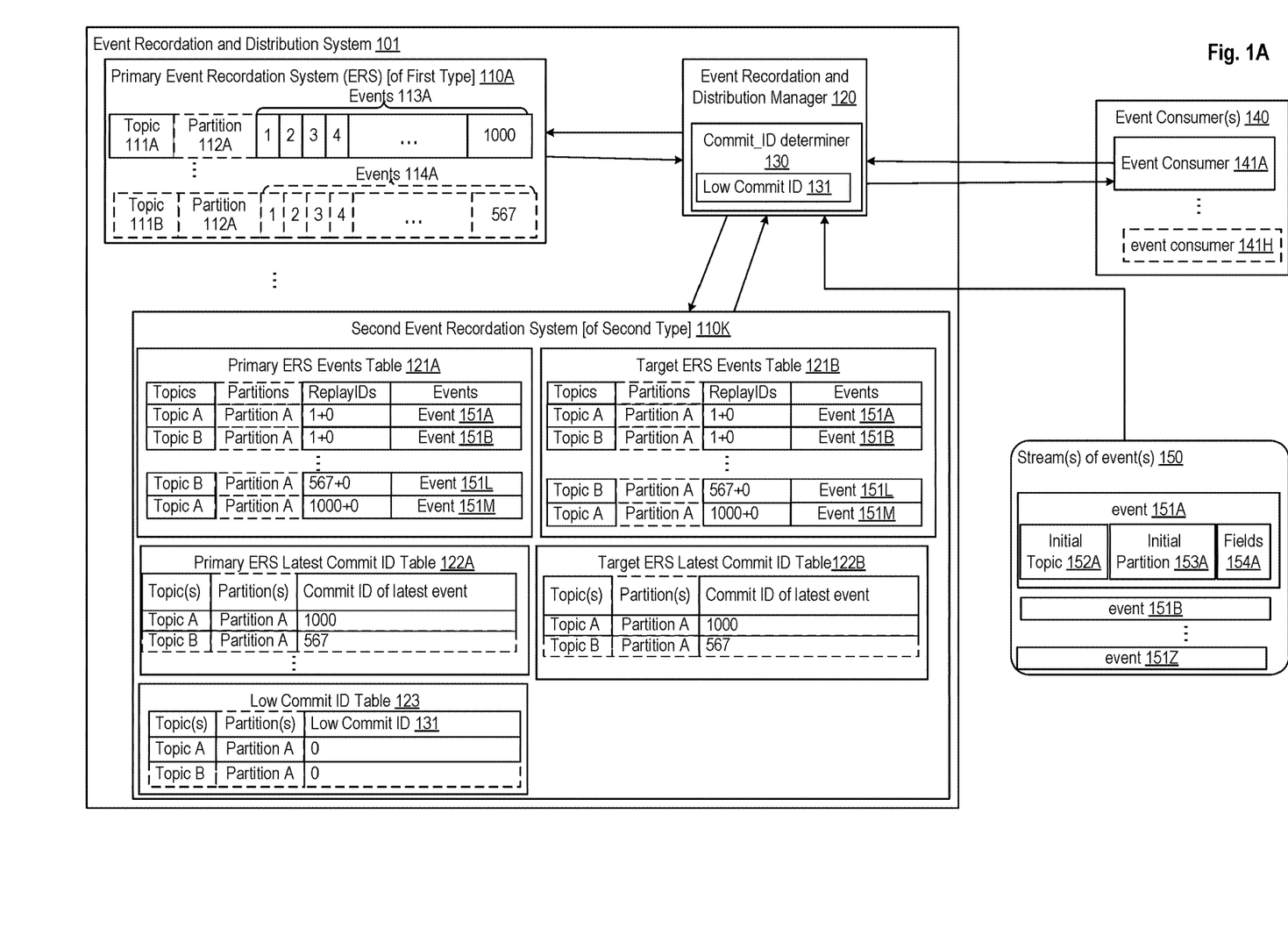
FIG. 1A illustrates a block diagram of a system for enabling a mechanism of disaster recovery (DR) and instance refresh in an event recordation system of a multi-tenant environment according to one implementation.

FIG. 1A illustrates a block diagram of an exemplary architecture 100 for that enables a mechanism of disaster recovery and/or instance refresh in an event recordation system of a multi-tenant environment in accordance with some implementations. Architecture 100 includes an event recordation and distribution system 101, one or more event consumers 140, and one or more streams of events 150. The streams of events 150 are received from a stream manager (not shown in FIG. 1A) that manages the receipt of streams generated by IoT devices, and/or application data source(s). The application data sources may include various applications running on software-as-a-service (SaaS), platform-as-a-service (PaaS) and/or infrastructure-as-a-service (IaaS) infrastructures. The applications can also include other types of distributed or non-distributed applications that produce streams of events. In some implementations, the architecture 100 runs on a distributed system, typically, among a multitude of physical servers coupled through a physical network (not shown).

The IoT devices and application(s) which are sources of the streams of events 150 include software and/or a combination of software and hardware that run on electronic devices. In one implementation, the event can be accessed via an application programming interface (API) that allows sensors, devices, gateways, proxies and other kinds of clients to register data so that data can be ingested from them. Data from the data sources can include events in the form of structured data (e.g. user profiles and the interest graph), unstructured text (e.g. tweets) and semi-structured interaction logs. Examples of events include device logs, clicks on links, impressions of recommendations, numbers of logins on a particular client, server logs, user's identities (sometimes referred to as user handles or user IDs and other times the users' actual names), content posted by a user to a respective feed on a social network service, social graph data, metadata including whether comments are posted in reply to a prior posting, events, news articles, and so forth.

Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the event streams input to the event recordation and distribution system 101 is intended to be stored in one of multiple event recordation systems 110A-110K and to be consumed, in real-time, pseudo-real time, or on-demand, by one or more event consumers 140.

Each stream of events from the event streams 150 includes one or more events. For example, stream 150 includes events 151A-Z. Each event from the stream includes an initial topic, an initial partition, and one or more additional fields. The additional fields can be referred to as a payload of the event. For example, event 151A has an initial topic 152A, an initial partition 153A, and one or more additional fields 154A. Typically events of a stream may have one of multiple initial partitions and initial topics. Some events may share the same partition and topic. For example, when a partition refers to an organization ID, all events received with that same partition belong to the same organization within a multi-tenant system. Similarly, when the topic is an alphanumerical value entered by a user of the multi-tenant system to be associated with a record, an account, a task, etc., the events of a single stream have the same topic. Further the topic and partition allow the event consumers to request the events from the stream of events.

The event consumers 140, can be software run environments used for gaining insight on the data embedded in the events, for gaining insight on the operations and actions performed in the applications and/or the IoT devices, and/or for gaining insight on the environment controlled or measured by the IoT devices and/or applications. In some implementations, the event consumers can request to obtain the events and process the events to perform one or more of audit, debug and support, forensic and compliance, and/or analytics of the applications and IoT devices. In some implementations, the event consumers may be implemented in a distributed environment, where multiple event consumers can be implemented on one or more servers. The event consumers can be owned and operated by a same entity such as a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). The one or more event consumers 140 can include one or more of the services offered by the cloud computing architecture.

In some implementations, the event consumers 140 may request to access the events by transmitting a request to the event recordation and distribution system 101. For example, the request can be for event(s) with initial topic 152A and partition 153A. In this example, the event consumer 141A requests to obtain events with associated initial topic 152A and partition 153A. In some implementation, the request for the events can include a commit ID. A commit ID of an event represents an identifier of the event that is indicative of the order of storage of the event in a corresponding event recordation system. In some implementations, the commit ID included in the request is an identifier of the latest event received by the event consumer from the system 101. In other implementations, the commit ID included in the request is an identifier of an event that is yet to be received by the event consumer from the system 101. For example, the commit ID can be the ID following the commit ID of the event received at the event consumer from the system 101. Transmitting a request with the commit ID to the system 101, indicates that the event consumer 141A is interested in receiving events with commit ID that were stored in the event recordation system(s) after the event associated with the transmitted commit ID.

In some implementations, the request can be an API call. In some implementations can be a request to subscribe to a channel of events identified by the initial topic and the initial partition.

The event recordation and distribution system 101 includes an event recordation and distribution manager 120, and one or more event recordation systems 110A-K. The event recordation and distribution system (ERDS) 101 is operative to receive streams of events 150 process them to be stored in one or more event recordation systems 110A-K and respond to requests from one or more event consumers 140 with events based on initial topic and initial partitions for the events.

In some implementations, the event recordation system of first type 110A is a messaging system that can be used to publish events and transmit events to consumers based on corresponding subscriptions. In some implementations, the topics/partitions used by event producers to publish the events/messages, and the topics/partitions used by the event consumers to subscribe for receiving the events are the same topics/partitions used for storing the events in the messaging system. In some implementations, the event consumers request events based on initial topic/partition, while these events are stored based on modified topics partitions such that multiple initial topic/partitions are aggregated in a single one of the physical topic/partition used for storing the events.

In the event recordation system of first type 110A the events are grouped with an associated topic and partition (e.g., topic 111A and topic 111B). Each event includes an associated commit ID that indicates the identifier of the event when stored in the event recordation system of first type 110A. This commit ID can be used as a confirmation that the event is physically stored in the system. The commit ID indicates the order of storage of a particular event that is associated with the same topic/partition as other events. In some implementations, the commit ID is a number that increases from older events to more recent events. For example, the first event recorded in the primary event recordation system of first type 110A for topic 111A and partition 112A has a commit ID of 1, the next one has a commit ID of 2, until the last one recorded at the current time having the commit ID 1000. In another example, the first event recorded in the primary event recordation system of first type 110A for topic 111B and partition 112A has a commit ID of 1, the next one has a commit ID of 2, until the last one recorded at the current time having the commit ID 567. In some implementations, the commit ID of the latest event stored for a given pair topic/partition is recorded and available to the event recordation and distribution manager 120. For example, the commit ID of the last event recorded in the primary ERS 110A is stored in a Primary ERS Latest commit ID table 122A of event recordation system of second type 110K. For example, for topic A and partition A, the commit ID of latest event recorded in ERS of First Type 110A is 1000 and for topic B and partition A the latest event recorded in ERS of First Type 110A is 567. Thus, the events 113A are events recorded/stored in the event recordation system of first type 110A that are ordered based on the time at which they were stored.

The system includes several types of event recordation systems. For example, the system includes an event recordation system of first type 110A and an event recordation system of second type 110K. Each one of the event recordation systems stores data according to a different data structure mechanism. For example, 110A may be a messaging system implemented based on a publish/subscribe platform, and the system 110K can be a long-term storage non-relational database. Alternatively, other types of data structure systems can be used, such as relational databases, in each one of the event recordation systems 110A-K.

In some implementations, the event recordation system of first type 110A is a short-term storage medium, where the events have a time to live associated with them after which they expire, and they are deleted from the system. In some implementations, events may be copied from the first event recordation system 110A to the second event recordation system 110K. For example, the primary ERS events table 121A includes copies of the events recorded in the primary event recordation system of first type 110A. This table is replicated for a target ERS. The table 121A includes the events that are published in the Primary ERS 110A such that CommitIDs are keys that may be used to retrieve the events in the table 121A. The commitIDs in the table 121A are generated based on the commitID of the events in the Primary ERS 110A. Each commitID in table 121A equal the current commit ID of the event in the primary ERS 110A added to the primary ERS low commit ID (low commit ID) defined for this topic and partition in table 123A. In some implementations, the commit ID of latest event stored in the table 122A for each topic and partition is the commit ID of the latest event copied from the primary ERS of first type 110A to the primary ERS events table 121A in the ERS of second type 110K.

After recordation of the events, an event consumer 141A requests, events with initial topic 152 and initial partition 153A. In this example, the event consumer 141A requests to obtain events with associated initial topic and partition. In some implementations, the request for the events is a request to the event recordation and distribution manager 120 to transmit events received starting the time of receipt of the request. For example, the event consumer 141A subscribes to a channel of events (identified with the initial topic and/or partition) and the event consumer 141A starts receiving any new events that are received at the event recordation and distribution system 101 after the subscription is acknowledged.

When the primary event recordation system of first type 110A is operating properly and no failure occurred, the event recordation and distribution manager 120 retrieves the events form the primary ERS 110A to transmit to the event consumer 141A. Prior to transmitting the event to the consumer 141A, the event recordation and distribution manager 120, determines a commit ID to be transmitted with the event to the consumer, this commit ID can be referred to as a replay ID. The commit ID is determined based on the commit ID of the event when stored in the ERS 110A and an offset that is added to this commit ID. The offset equals the primary ERS low commit ID 131 for the topic and partition that correspond to the event. In the illustrated example, the low commit ID 131 is initialized at 0 when the system starts processing events. Thus, the external commit ID, i.e., the replay ID, that is exposed to event consumers is different than the commit ID used to store the event in the primary event recordation system of first type 110A. The replay ID equals the commit ID of the event as recorded in the primary event recordation system of first type 110A added to a low offset value determined based on the table 123A. This value is initialized at 0 and updated as it will be described below upon occurrence of a disconnection or failure of the primary ERS. This modified commit ID, i.e., the replay ID, is an identifier of the event that is exposed to the consumers as well as for storing the events in the event recordation system of second type 110K, in the primary ERS events table 121A.

The table 121A stores copies of the events recorded in the primary event recordation system 110A and is replicated in the ERS 110K for a target ERS events table 121B. The target ERS events table 121B is to be used when a failure of primary ERS 110A occurs and a target ERS is started. The Event recordation system of second type 110K also includes a primary ERS latest commit ID table 122A and target ERS latest commit ID table 122B. the table 122B is a replica of the table 122A such that all information stored in the table 122B is a copy of the information stored in the table 122A. Each one of the tables 121A and 122A is used when the primary event recordation system of first type 110A is in operation, while the tables 121B and 122B are used when the target ERS is in operation. The primary ERS latest commit ID table 122A includes the commit ID of the latest event stored in the event recordation system of second type 110K drained from the primary ERS 110A.

Figure 1B:
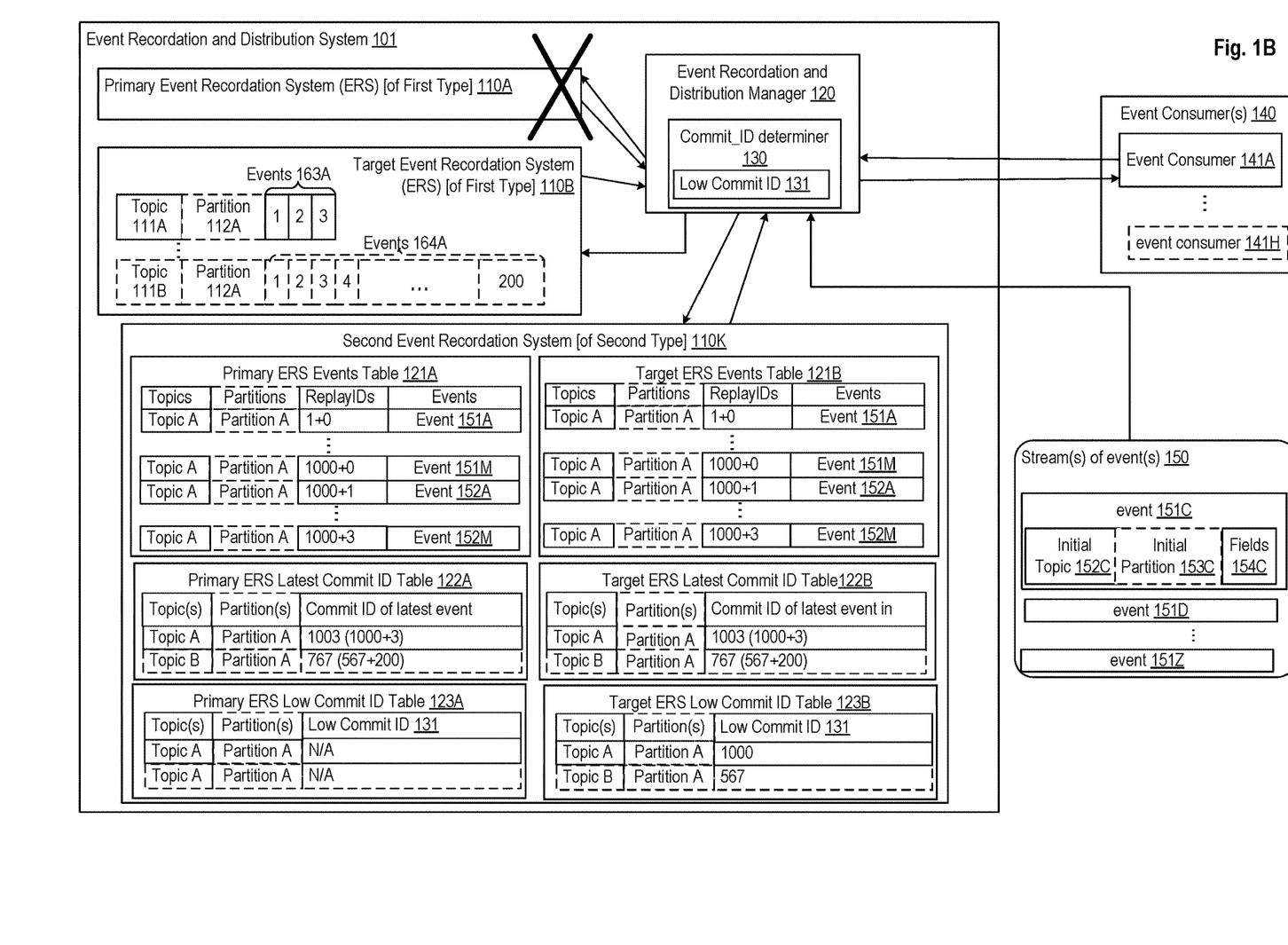
FIG. 1B illustrates a block diagram of a system for a mechanism of disaster recovery (DR) and instance refresh in an event recordation system of a multi-tenant environment according to one implementation.

FIG. 1B illustrates exemplary values reached in the tables 121A, 122A, 123A, 121B, 122B and in the primary ERS 110A at a given time. At this moment in time, a disaster recovery mechanism or a site switch mechanism occurs such that the primary ERS 110A is no longer available to the event recordation and distribution manager 120 to retrieve events.

The disaster recovery mechanism is started and a target ERS of firs type 110B is established by creating the partitions and topics that were present in the primary ERS 110A. These partitions and topics are used to record new events received in the system (e.g., events 151C-D). The commit IDs of these new events is initialized at 0 and is incremented in the ERS 110B as new events are stored. Prior to starting to process incoming traffic at the target ERS 110B, the event recordation and distribution manager 120 causes the values of the low commit ID 131 in the target ERS low commit ID table 123A to be set to the values of the primary ERS latest commit ID table 122A for respective topics and partitions.

Once the target ERS low commit ID table 123A is updated based on the commit IDs of the latest events recorded in the table 121A from ERS 110A, the target ERS 110B may start receiving and recording events 163A. The events 163A stored in target ERS 110B are transmitted to the consumers with a modified commit ID. The modified commit ID, replay ID, is determined based on the commit ID of the event when stored in the target ERS 110B and an offset that is added to the commit ID. The offset equals the updated target ERS low commit ID 131 for the topic and partition that correspond to the event. In the illustrated example, the value of the low commit ID 131 is now set at 1000. Thus, the external commit ID, i.e., the replay ID, that is exposed to event consumers is different than the commit ID used to store the event in the target event recordation system of first type 110B. The commit ID equals the commit ID of the event as recorded in the target event recordation system of first type 110B added to a low offset value determined based on the table 123B. This value is updated based on the latest event stored in the primary ERS prior to its failure or prior to the switch to the target ID. This modified commit ID is the commit ID exposed to the consumers as well as for storing the events in the event recordation system of second type 110K, in the primary ERS events table 121A. The updating of the commit ID prior to the switch to the target ERS 110B allows for the exposed commit ID to remain consistent across the primary and the target ERS such that a consumer is unaware of the change that occurred and does not see any interruption in the flow of events as identified by their commit IDs. Referring to the illustrated example, when a new event_1 is published in target ERS 110B and later delivered to an event consumer, it is delivered with commit ID=low commit ID(=1000)+current commit ID in target ERS 110A (1)=1000+1=1001, as if the same stream of events continues without any interruption.

Once the recovery mechanism is in place, the system can respond to requests for current events from the target ERS 110A and can respond to replay requests from the target ERS events table 121B. When the request is a replay request, the request for the events can include a commit ID. The commit ID included in the request identifies the latest event received by the event consumer from the system 101. In other implementations, the commit ID included in the request is an identifier of an event that is yet to be received by the event consumer from the system 101. For example, the commit ID can be the ID following the commit ID of the last event received at the event consumer from the system 101. Transmitting a request with the commit ID to the system 101, indicates that the event consumer 141A is interested in receiving events that were stored in the event recordation system(s) after the event associated with the transmitted commit ID. This request may include a request for historical events, which are events stored in the event recordation system during a period of time that precedes the time of receipt of the request by the event recordation and distribution manager 120.

The manager 120 upon receipt of the request and the commit ID for a given partition/topic determines whether a rule should be applied to the event by comparing the commit ID received from the event consumer with the commit ID stored in the rule. If the commit ID received in the request is smaller than the switch commit ID (which is the commit ID at which the switch to the target ERS occurred), the event is retrieved from the table 121B of ERS 110B. Alternatively, if the commit ID received in the request is greater than the switch commit ID, the event is retrieved from the target ERS 110B.

The system and method described herein allow the event consumers to have the illusion of receiving a continuous non-stop event stream even when a switch occurs from a first ERS to a second ERS. The mechanisms described herein allow for an accurate and truly seamless disaster recovery mechanism in event recordation systems. The fail-over is entirely transparent to the event consumers, as opposed to other existing solutions, where the consumers need to implement additional logic to deal with failover.

Figure 2:
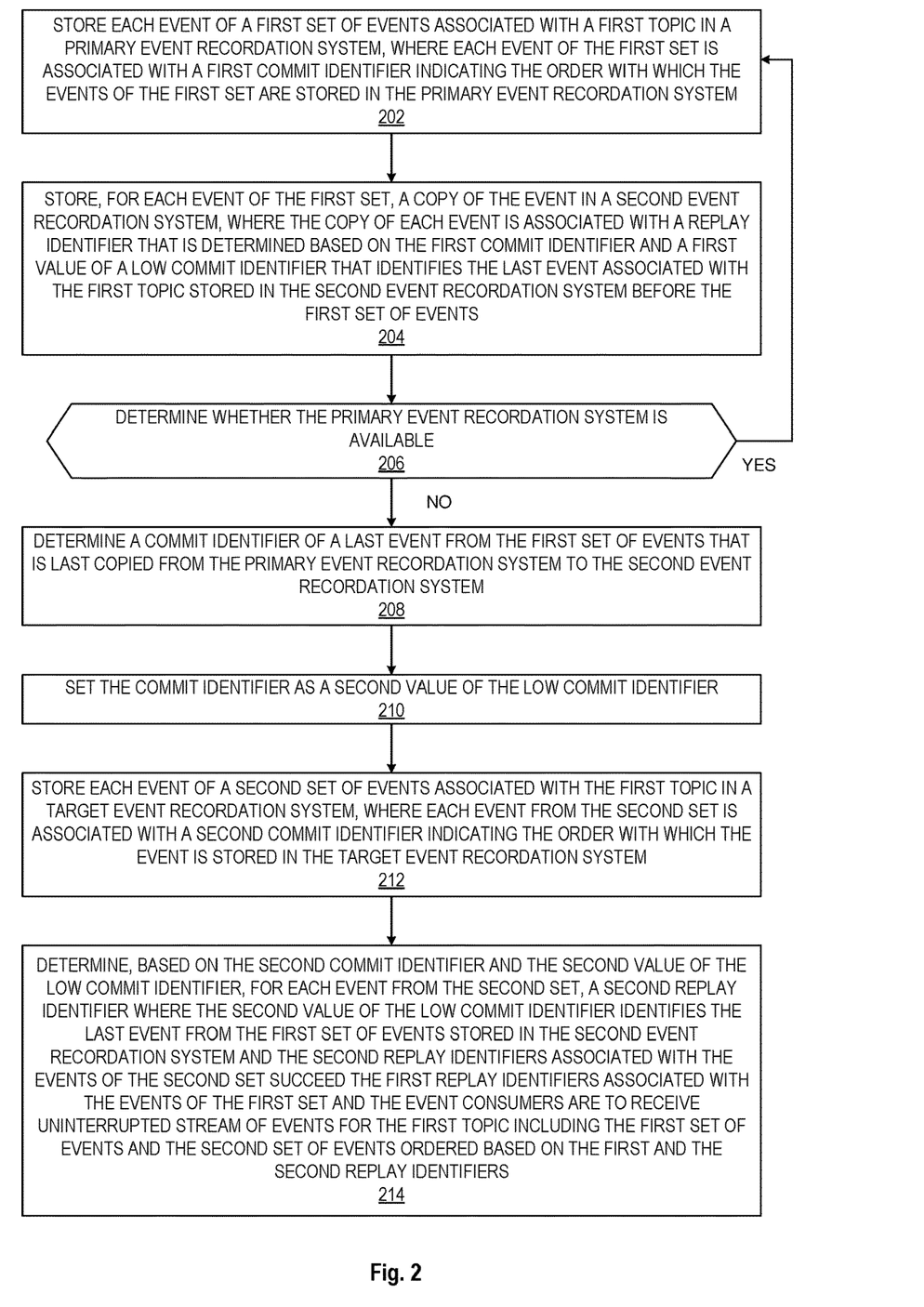
FIG. 2 illustrates a flow diagram of exemplary operations for storing multiple set of events associated with a first topic in an event recordation and distribution system, in accordance to some implementations.
Figure 3:
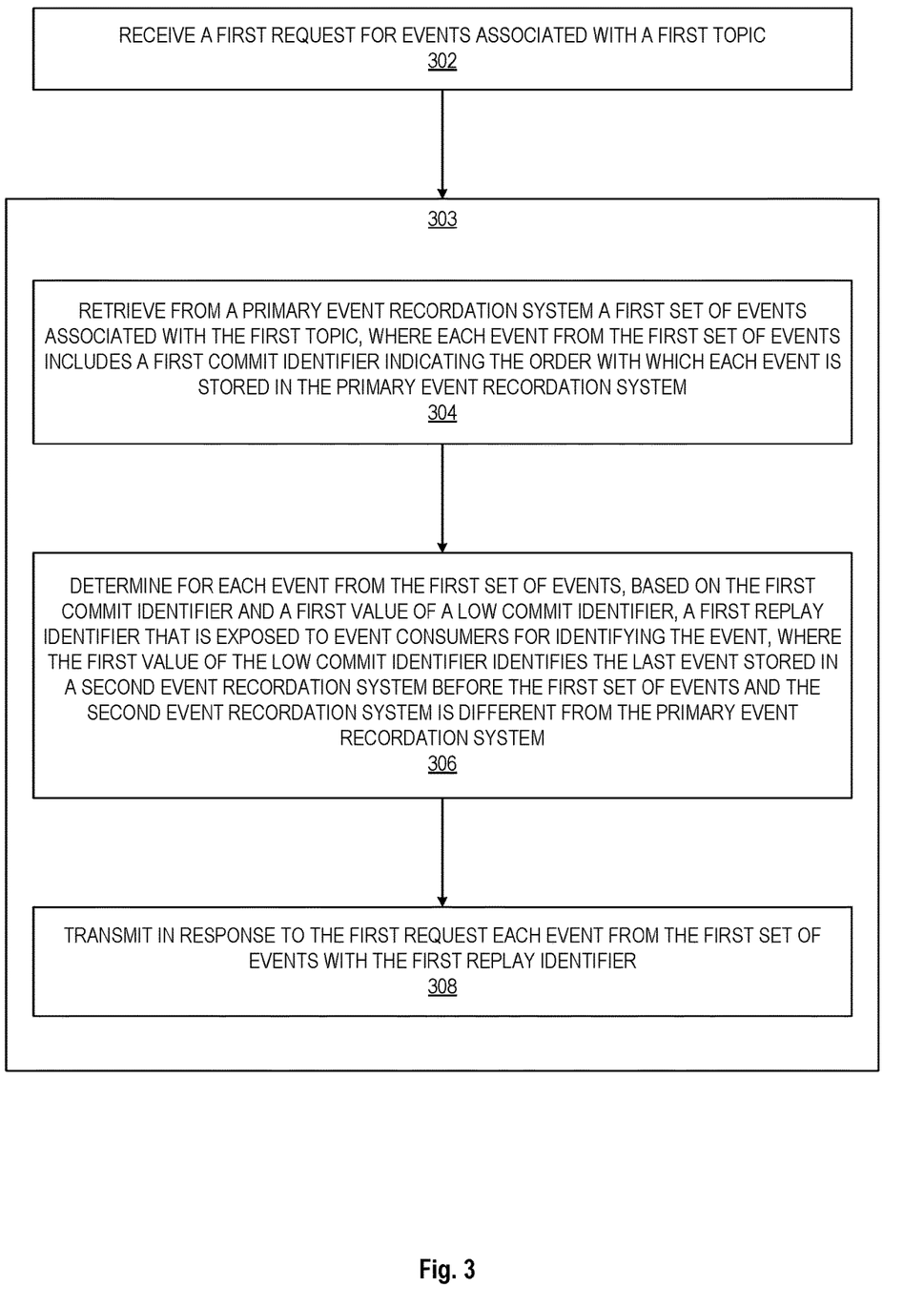
FIG. 3 illustrates a flow diagram of exemplary operations for responding to a first request for events associated with a first topic, in accordance with some implementations.
Figure 4:
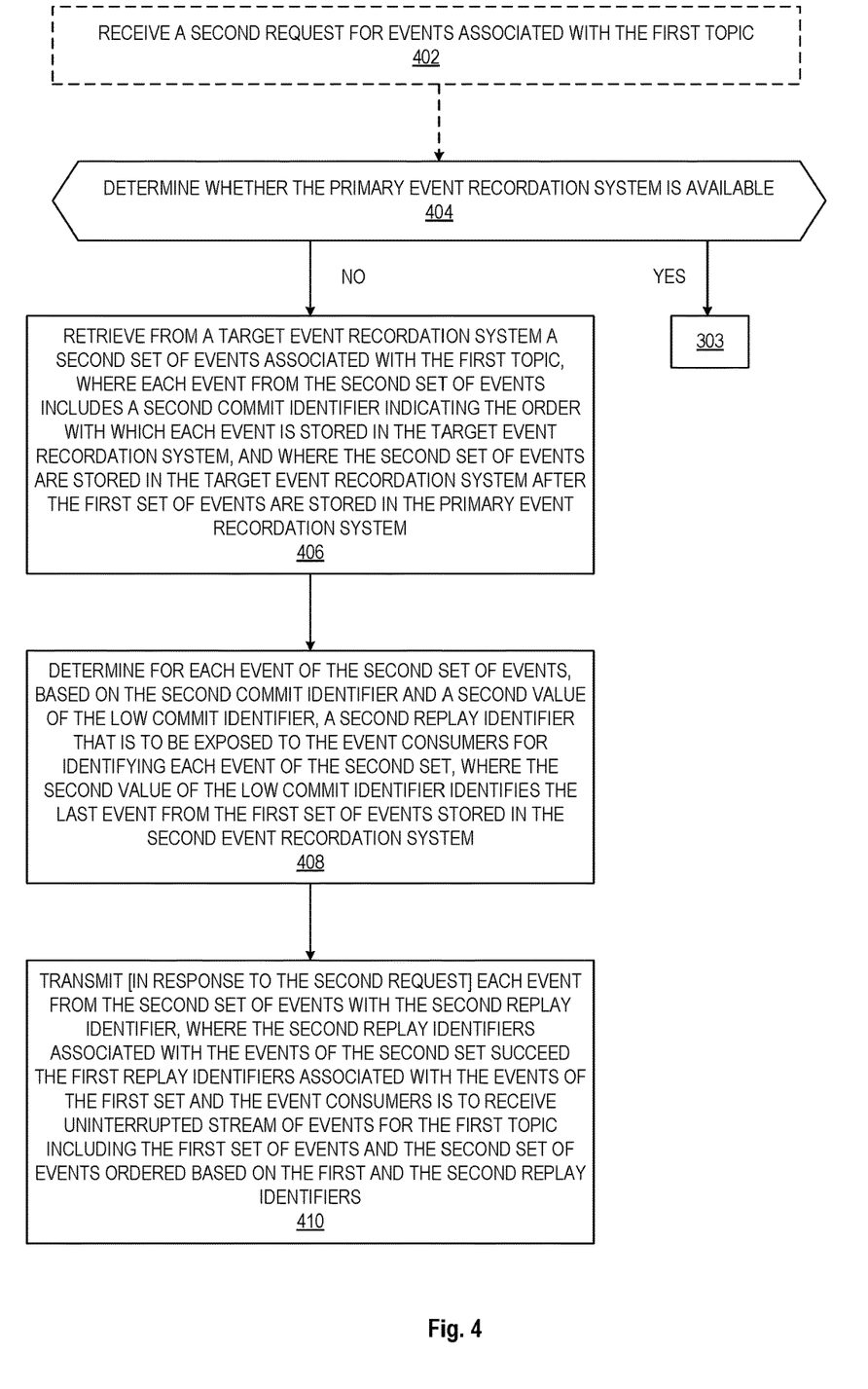
FIG. 4 illustrates a flow diagram of exemplary operations for responding to a second request for events associated with the first topic, in accordance with some implementations.

The operations in the flow diagrams of FIGS. 2-4 are described with reference to the exemplary implementations in FIGS. 1A-B. However, the operations of the flow diagrams can be performed by implementations other than those discussed with reference to FIGS. 1A-B, and the implementations discussed with reference to these other figures can perform operations different than those discussed with reference to the flow diagrams.

FIG. 2 illustrates a flow diagram of exemplary operations for storing multiple set of events associated with a first topic in an event recordation and distribution system, in accordance to some implementations. In some implementations, the operations of FIG. 2 are performed by an event recordation and distribution system 101. In particular, the operations can be performed by the event recordation and distribution manager 120. In other implementations, other systems can implement the operations of FIG. 2 without departing from the scope of the present implementations.

At operation 202, the event recordation and distribution manager 120 stores each event of a first set of events associated with a first topic in a primary event recordation system. For example, upon receipt of the stream of events 150, the events 151A-Z are stored in the primary event recordation system 110A. In some implementations, the primary event recordation system 110A is of a first type (e.g., short term storage system, message-based storage system, etc.). Each event of the first set is associated with the first topic. For example, event 151A is associated with an initial topic 153A and a topic 111A. The initial topic or the couple initial topic/initial partition are used by one or more event consumers 140 to request events from the event recordation and distribution system 101. The topic 111A or the couple topic 111A/partition 112A are used to store the events in the event recordation system 110A. In some implementations, the initial topic 111A and the topic 111A are the same. Alternatively, the topic and initial topic are different. In these implementations the topic 111A and partition 112A used to store the events are modified topics/partitions such that multiple initial topics/initial partitions are aggregated in a single one of the physical topic/partition used for storing the events. Each event from the first set of events is associated with a first commit identifier indicating the order with which the events of the first set are stored in the first event recordation system. For example, the events 113A are stored with the set of commit identifiers ranging from the value 1 to 1000 for the topic 111A and the partition 112A.

The flow of operations moves to operation 204, at which for each event of the first set, a copy of the event is stored in a second event recordation system 110B. The copy of each event is associated with a replay identifier that is determined based on the first commit identifier and a first value of a low commit identifier that identifies the last event associated with the first topic stored in the second event recordation system before the first set of events. In the illustrated example, the first value of the low commit identifier 131 is set to "0" for the topic 111A and the partition 112A.

At operation 206, a determination of whether the primary event recordation system is available is performed. Responsive to determining that the primary event recordation is available, the storing of the events for the first topic continues to be performed in the primary event recordation system. Responsive to determining that the primary event recordation is not available, the operations 208-214 are performed. At operation 208, a commit identifier of a last event from the first set of events is determined. The commit identifier identifies an event that is last copied from the primary event recordation system to the second event recordation system. For example, table 122A includes the commit identifier of the last event copied in the second event recordation system 110K, commit ID of latest event is 1000. At operation 210, the commit identifier of the last event is set as a second value of the low commit identifier 131

Upon update of the value of the low commit identifier 131, the event recordation and distribution manager 120 stores each event of a second set of events 163A associated with the first topic in a target event recordation system 110B. Each event from the second set 163A is associated with a second commit identifier indicating the order with which the event is stored in the target event recordation system 110B.

At operation 214, the event recordation and distribution manager 120 determines, based on the second commit identifier and the second value of the low commit identifier, for each event from the second set, a second replay identifier. The second value of the low commit identifier 131 identifies the last event (e.g., ID 1000) from the first set of events 113A stored in the second event recordation system 110K. The second replay identifiers associated with the events of the second set 163A succeed the first replay identifiers associated with the events of the first set 113A and the event consumers, e.g., event consumer 141A, are to receive an uninterrupted stream of events for the first topic including the first set of events and the second set of events ordered based on the first and the second replay identifiers. The first and the second replay identifier form a consecutive set of identifiers such that the first identifier from the second replay identifiers immediately follows the last identifier of the first replay identifiers. In the illustrated example, the event consumer 141A receives the first set of events associated with the first topic as stored in the primary event recordation system with replay IDs 0 to 1000 and followed with the second set of events associated with the first topic as stored in the target event recordation system with replay IDs 1001 to 1003.

The system and method described herein allow the event consumer 141A to have the illusion of receiving a continuous non-stop event stream even when a switch occurs from the primary ERS 110A to the target ERS 110K. The mechanisms described herein allow for an accurate and truly seamless disaster recovery mechanism in event recordation systems. The fail-over is entirely transparent to the event consumers, as opposed to other existing solutions, where the consumers need to implement additional logic to deal with failover.

FIG. 3 illustrates a flow diagram of exemplary operations for responding to a first request for events associated with a first topic, in accordance with some implementations. In some implementations, the operations of FIG. 3 are performed by an event recordation and distribution system 101. In particular, the operations can be performed by the event recordation and distribution manager 120. In other implementations, other systems can implement the operations of FIG. 3 without departing from the scope of the present implementations.

At operation 302, the event recordation and distribution manager 120 receives a first request for events associated with a first topic. For example, the event consumer 141A requests to obtain events with associated initial topic and partition. In some implementations, the request for the events is a request to the event recordation and distribution manager 120 to transmit events received starting the time of receipt of the request. For example, the event consumer 141A subscribes to a channel of events (identified with the initial topic and/or partition) and the event consumer 141A starts receiving any new events that are received at the event recordation and distribution system 101 after the subscription is acknowledged.

When the primary event recordation system of first type 110A is operating properly and no failure occurred, the event recordation and distribution manager 120 retrieves, at operation 304, from a primary event recordation system, e.g., 110A, a first set of events 113A associated with the first topic. Each event from the first set of events includes a first commit identifier indicating the order with which each event is stored in the primary event recordation system 110A.

Prior to transmitting the events to the consumer 141A, the event recordation and distribution manager 120, determines, at operation 306, for each event from the first set of events 113A, based on the first commit identifier and a first value of a low commit identifier, a first replay identifier that is exposed to event consumers for identifying the event. The first value of the low commit identifier identifies the last event stored in a second event recordation system before the first set of events and the second event recordation system is different from the primary event recordation system. In the illustrated example, the replay ID is determined based on the commit ID of the event when stored in the ERS 110A and an offset that is added to this commit ID. The offset equals the primary ERS low commit ID 131 for the topic and partition that correspond to the event. The low commit ID 131 is initialized at 0 when the system starts processing events. Thus, the replay ID, that is exposed to event consumers is different than the commit ID used to store the event in the primary event recordation system of first type 110A. The replay ID equals the commit ID of the event as recorded in the primary event recordation system of first type 110A added to the low offset value determined based on the table 123A. The replay ID is used as an identifier of the event that is exposed to the consumers and is used for storing the events in the primary ERS events table 121A of the event recordation system of second type 110K.

Once the events are retrieved and the replay ID determined, the operations moves to operation 308 at which each event from the first set of events with the replay identifier is transmitted in response to the first request. For example, the set of events is transmitted with their respective first set of replay identifiers to the event consumer 141A.

The example discussed with respect to FIG. 1A shows that when no event is stored in the second event recordation 110K for the first topic before the first set of events 113A, for each event from the first set of events, the replay identifier is identical to the commit identifier identifying the order with which each event is stored in the primary event recordation system 110A.

FIG. 4 illustrates a flow diagram of exemplary operations for responding to a second request for events associated with the first topic, in accordance with some implementations. In some implementations, the operations of FIG. 4 are performed by an event recordation and distribution system 101. In particular, the operations can be performed by the event recordation and distribution manager 120. In other implementations, other systems can implement the operations of FIG. 4 without departing from the scope of the present implementations.

A disaster recovery mechanism or a site switch mechanism can occur when the primary ERS 110A is no longer available to the event recordation and distribution manager 120 to retrieve events. The primary ERS 110A may no longer be available due to a scheduled maintenance procedure or alternatively due to an unplanned failure of the ERS 110A or a connection link between the ERS 110A and the manager 120.

The disaster recovery mechanism is started and a target ERS of firs type 110B is established by creating the partitions and topics that were present in the primary ERS 110A. These partitions and topics are used to record new events received in the system (e.g., events 151C-D). The commit IDs of these new events is initialized at 0 and is incremented in the ERS 110B as new events are stored. Prior to starting to process incoming traffic at the target ERS 110B, the event recordation and distribution manager 120 causes the values of the low commit ID 131 in the target ERS low commit ID table 123A to be set to the values of the primary ERS latest commit ID table 122A for respective topics and partitions as it is discussed above with reference to FIG. 2.

Once the target ERS low commit ID table 123A is updated based on the commit IDs of the latest events recorded in the table 121A from ERS 110A, the target ERS 110B may start receiving and recording events 163A.

At operation 404, a determination of whether the primary ERS 110A is available is performed. Responsive to determining that the first event recordation system 110A is not available, operations 406-410 are performed. Responsive to determining that the first event recordation system 110A is available, operations 303 are performed.

At operation 406, for each event of the second set of events, based on the second commit identifier and a second value of the low commit identifier, a second replay identifier that is to be exposed to the event consumers for identifying each event of the second set. The second value of the low commit identifier (1000) identifies the last event from the first set of events stored in the second event recordation system.

Referring back to the example of FIGS. 1A-B, the replay ID, is determined based on the commit ID of the event when stored in the target ERS 110B and an offset that is added to the commit ID. The offset equals the updated target ERS low commit ID 131 for the topic and partition that correspond to the event. In the illustrated example, the value of the low commit ID 131 is now set at 1000. Thus, the replay ID that is exposed to event consumers is different than the commit ID used to store the event in the target event recordation system of first type 110B. The replay ID equals the commit ID of the event as recorded in the target event recordation system of first type 110B added to a low offset value determined based on the table 123B. This value is updated based on the latest event stored in the primary ERS 110A prior to its failure or prior to the switch to the target ERS 110B. The replay ID is the ID exposed to the consumers as well as the ID used for storing the events in the primary ERS events table 121A of the event recordation system of second type 110K. The updating of the value of the low commit ID prior to the switch to the target ERS 110B allows for the replay ID to remain consistent across the primary and the target ERS such that an event consumer is unaware of the change that occurred and does not see any interruption in the flow of events as identified by their replay IDs. When a new event_1 is published in target ERS 110B and later delivered to an event consumer, it is delivered with commit ID=low commit ID(=1000)+current commit ID in target ERS 110A (1)=1000+1=1001, as if the same stream of events continues without any interruption.

At operation 408, each event from the second set of events is transmitted with the second replay identifier. The second replay identifiers associated with the events of the second set succeed first replay identifiers associated with the events of the first set and the first event consumer is to receive uninterrupted stream of events for the first topic including the first set of events and the second set of events ordered based on the first and the second replay identifiers.

Once the recovery mechanism is in place, the system can respond to requests for current events from the target ERS 110A and can respond to replay requests from the target ERS events table 121B. For example, the operations 404-410 can be performed following the receipt at operation 402, of a second request for events where the request is for current events, i.e., new events that are stored in the target ERS 110A.

In other implementations, the system can receive a replay request including a third replay identifier identifying an event from the first set. When the request is a replay request, the request for the events can include a commit ID. The third replay identifier is a commit ID included in the request that identifies the latest event received by the event consumer from the system 101. In other implementations, the third replay ID is an identifier of an event that is yet to be received by the event consumer from the system 101. For example, the third replay ID can be the ID following the commit ID of the last event received at the event consumer from the system 101. Transmitting a request with the third replay ID to the system 101, indicates that the event consumer 141A is interested in receiving events that were stored in the event recordation system(s) after the event associated with the transmitted commit ID. The request is a replay request when it include a request for historical events, which are events stored in the event recordation system during a period of time that precedes the time of receipt of the request by the event recordation and distribution manager 120.

Responsive to determining that the primary event recordation system is not available, the events are retrieved from the second event recordation system 110K and from the target ERS 110K. A subset of events from the first set of events as stored in the second event recordation system, is retrieved, based on the third replay identifier. The second set of events from the target event recordation system 110K is retrieved, based on the third replay identifier. In response to the replay request, the subset of events and the second set of events are transmitted.

The manager 120 upon receipt of the request and the replay ID for a given partition/topic determines whether a rule should be applied to the event by comparing the replay ID received from the event consumer with the commit ID stored in the rule. If the replay ID received in the replay request is smaller than the switch commit ID (which is the commit ID at which the switch to the target ERS occurred), the event is retrieved from the table 121B of ERS 110B. Alternatively, if the replay ID received in the replay request is greater than the switch commit ID, the event is retrieved from the target ERS 110B.

General Architecture:

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 5A:
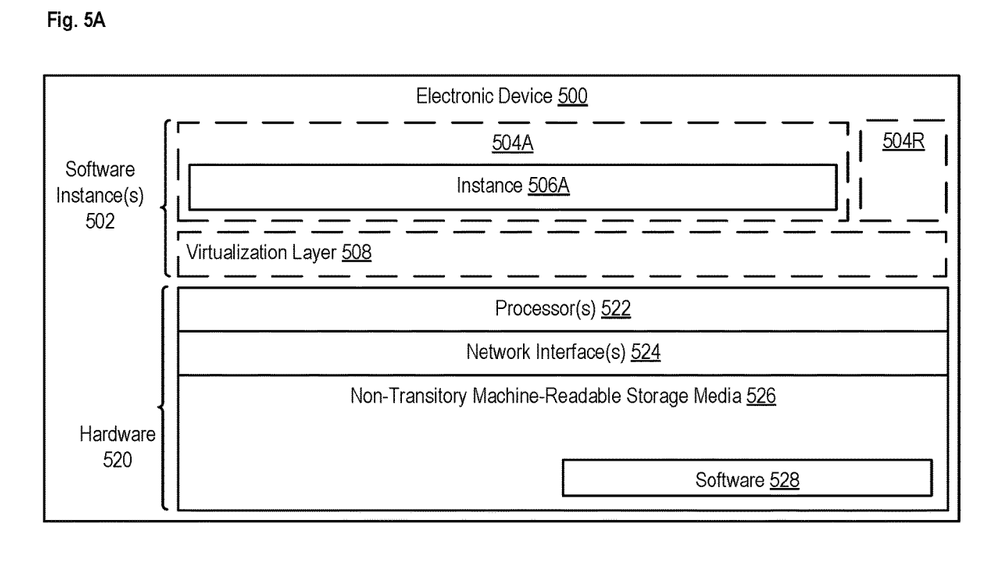
FIG. 5A is a block diagram illustrating an electronic device according to some example implementations.

FIG. 5A is a block diagram illustrating an electronic device 500 according to some example implementations. FIG. 2A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described event consumers 140, event recordation systems 110A-K, event recordation and distribution manager 120 may be implemented in one or more electronic devices 500. In one implementation: 1) each of the end user clients is implemented in a separate one of the electronic devices 500 (e.g., in user electronic devices operated by users where the software 528 represents the software to implement end user clients to interface with the applications and the log record consumers (e.g., a web browser, a native client, a portal, a command-line interface, and/or an application program interface (API) based upon protocols such as Simple Object Access Protocol (SOAP), Representational State Transfer (REST), etc.)); 2) event consumers 140, event recordation systems 110A-K, event recordation and distribution manager 120 are implemented in a separate set of one or more of the electronic devices 500 (e.g., a set of one or more server electronic devices where the software 528 represents the software to implement the service); and 3) in operation, the electronic devices implementing the end user clients, event consumers 140, event recordation systems 110A-K, event recordation and distribution manager 120 would be communicatively coupled (e.g., by a network) and would establish between them (or through one or more other layers) connections. Other configurations of electronic devices may be used in other implementations (e.g., an implementation in which the end user client and event consumers 140, event recordation systems 110A-K, event recordation and distribution manager 120 are implemented on a single electronic device 500).

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Figure 5B:
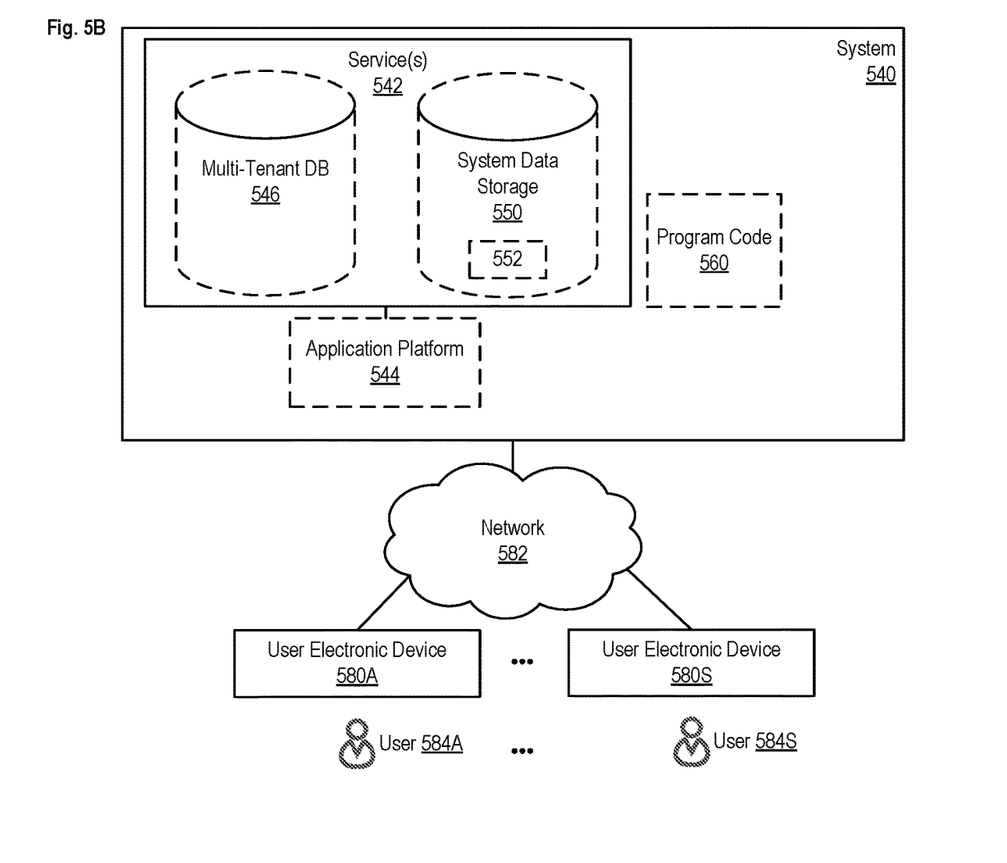
FIG. 5B is a block diagram of an environment where a mechanism of disaster recovery (DR) and instance refresh in an event recordation system of a multi-tenant environment may be deployed, according to some implementations.

FIG. 5B is a block diagram of an environment where a tokenizer and log record consumers may be deployed, according to some implementations. A system 540 includes hardware (a set of one or more electronic devices) and software to provide service(s) 542, including the log consumers and/or the tokenizer. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communicate with each other and/or with one or more of the user electronic devices 580A-S via one or more Application Programming Interface(s) (APIs) (e.g., a Representational State Transfer (REST) API). The user electronic devices 580A-S are operated by users 584A-S.

In one implementation, the system 540 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including event consumers 140, event recordation systems 110A-K, event recordation and distribution manager 120, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method in an event recordation and distribution system, the method comprising:
   receiving a first request for events associated with a first topic;
   retrieving from a primary event recordation system a first set of events associated with the first topic, wherein each event from the first set of events includes a first commit identifier indicating the order with which each event is stored in the primary event recordation system;

determining for each event from the first set of events, based on the first commit identifier and a first value of a low commit identifier, a first replay identifier that is exposed to event consumers for identifying the event, wherein the first value of the low commit identifier identifies the last event stored in a second event recordation system before the first set of events and the second event recordation system is different from the primary event recordation system; and transmitting in response to the first request each event from the first set of events with the first replay identifier.

2. The method of claim 1, wherein when no event is stored in the second event recordation system for the first topic before the first set of events, for each event from the first set of events, the first replay identifier is identical to the first commit identifier identifying the order with which each event is stored in the primary event recordation system.

3. The method of claim 1, further comprising:
responsive to determining that the primary event recordation system is not available, performing the following:
retrieving from a target event recordation system a second set of events associated with the first topic, wherein each event from the second set of events includes a second commit identifier indicating the order with which each event is stored in the target event recordation system, and wherein the second set of events are stored in the target event recordation system after the first set of events are stored in the primary event recordation system,
determining for each event of the second set of events, based on the second commit identifier and a second value of the low commit identifier, a second replay identifier that is to be exposed to the event consumers for identifying each event of the second set, wherein the second value of the low commit identifier identifies the last event from the first set of events stored in the second event recordation system, and
transmitting each event from the second set of events with the second replay identifier, wherein second replay identifiers associated with the events of the second set succeed first replay identifiers associated with the events of the first set and an event consumer is to receive uninterrupted stream of events for the first topic including the first set of events and the second set of events ordered based on the first and the second replay identifiers.

4. The method of claim 3, further comprising:
storing each one from the first set of events in the second event recordation system with the first replay identifier.

5. The method of claim 4, further comprising:
receiving a replay request including a third replay identifier identifying an event from the first set; and
responsive to determining that the primary event recordation system is not available, performing the following:
retrieving, based on the third replay identifier, a subset of events from the first set of events as stored in the second event recordation system,
retrieving, based on the third replay identifier, the second set of events from the target event recordation system, and
transmitting, in response to the replay request, the subset of events and the second set of events.

6. The method of claim 5, wherein performing further includes:

determining a third commit identifier that corresponds to the third replay identifier, wherein the third commit identifier identifies an event as stored in at least one of the primary event recordation system and the target event recordation system;
determining that the third commit identifier identifies an event from the first set of events;
wherein retrieving the subset of events from the first set of events includes retrieving events with commit identifiers that are greater than the third commit identifier; and
wherein retrieving the second set of events from the target event recordation system is performed in response to determining that the third commit identifier identifies an event from the first set.

7. The method of claim 3, wherein the primary event recordation system and the target event recordation system are short term storage systems.

8. The method of claim 1, wherein the second event recordation system is a long-term storage recordation system.

9. The method of claim 1, wherein the event recordation and distribution system is a multi-tenant system and the first topic is associated with a tenant identifier uniquely identifying a tenant.

10. The method of claim 1, wherein the first request is a request to subscribe to the first topic.

11. A non-transitory computer readable storage medium including code which when executed by one or more processors in an event recordation and distribution system cause the event recordation and distribution system to perform operations comprising:
receiving a first request for events associated with a first topic;
retrieving from a primary event recordation system a first set of events associated with the first topic, wherein each event from the first set of events includes a first commit identifier indicating the order with which each event is stored in the primary event recordation system;
determining for each event from the first set of events, based on the first commit identifier and a first value of a low commit identifier, a first replay identifier that is exposed to event consumers for identifying the event, wherein the first value of the low commit identifier identifies the last event stored in a second event recordation system before the first set of events and the second event recordation system is different from the primary event recordation system; and
transmitting in response to the first request each event from the first set of events with the first replay identifier.

12. The non-transitory computer readable storage medium of claim 11, wherein when no event is stored in the second event recordation system for the first topic before the first set of events, for each event from the first set of events, the first replay identifier is identical to the first commit identifier identifying the order with which each event is stored in the primary event recordation system.

13. The non-transitory computer readable storage medium of claim 11, further comprising:
responsive to determining that the primary event recordation system is not available, performing the following:
retrieving from a target event recordation system a second set of events associated with the first topic, wherein each event from the second set of events includes a second commit identifier indicating the order with which each event is stored in the target event recordation system, and wherein the second set of events are stored in the target event recordation system after the first set of events are stored in the primary event recordation system, determining for each event of the second set of events, based on the second commit identifier and a second value of the low commit identifier, a second replay identifier that is to be exposed to the event consumers for identifying each event of the second set, wherein the second value of the low commit identifier identifies the last event from the first set of events stored in the second event recordation system, and transmitting each event from the second set of events with the second replay identifier, wherein second replay identifiers associated with the events of the second set succeed first replay identifiers associated with the events of the first set and an event consumer is to receive uninterrupted stream of events for the first topic including the first set of events and the second set of events ordered based on the first and the second replay identifiers.

14. The non-transitory computer readable storage medium of claim 13, further comprising:
storing each one from the first set of events in the second event recordation system with the first replay identifier.

15. The non-transitory computer readable storage medium of claim 14, further comprising:
receiving a replay request including a third replay identifier identifying an event from the first set; and
responsive to determining that the primary event recordation system is not available, performing the following:
retrieving, based on the third replay identifier, a subset of events from the first set of events as stored in the second event recordation system,
retrieving, based on the third replay identifier, the second set of events from the target event recordation system, and
transmitting, in response to the replay request, the subset of events and the second set of events.

16. The non-transitory computer readable storage medium of claim 15, wherein performing further includes:
determining a third commit identifier that corresponds to the third replay identifier, wherein the third commit identifier identifies an event as stored in at least one of the primary event recordation system and the target event recordation system;
determining that the third commit identifier identifies an event from the first set of events;
wherein retrieving the subset of events from the first set of events includes retrieving events with commit identifiers that are greater than the third commit identifier; and
wherein retrieving the second set of events from the target event recordation system is performed in response to determining that the third commit identifier identifies an event from the first set.

17. The non-transitory computer readable storage medium of claim 13, wherein the primary event recordation system and the target event recordation system are short term storage systems.

18. The non-transitory computer readable storage medium of claim 11, wherein the second event recordation system is a long-term storage recordation system.

19. The non-transitory computer readable storage medium of claim 11, wherein the event recordation and distribution system is a multi-tenant system and the first topic is associated with a tenant identifier uniquely identifying a tenant.

20. The non-transitory computer readable storage medium of claim 11, wherein the first request is a request to subscribe to the first topic.

* * * * *